United States Patent
Fath

(10) Patent No.: US 8,104,239 B2
(45) Date of Patent: Jan. 31, 2012

(54) FASTENING DEVICE FOR FLAT COMPONENTS, ESPECIALLY SOLAR MODULES, TO BE ARRANGED ON A FRAMEWORK

(75) Inventor: Jan Mirko Fath, Georgensgmuend (DE)

(73) Assignee: FATH GmbH, Spalt (DE)

( * ) Notice: Subject to any disclaimer, the term of this patent is extended or adjusted under 35 U.S.C. 154(b) by 950 days.

(21) Appl. No.: 12/148,849

(22) Filed: Apr. 23, 2008

(65) Prior Publication Data
US 2008/0315061 A1    Dec. 25, 2008

(30) Foreign Application Priority Data
Jun. 14, 2007   (DE) .......................... 10 2007 027 997

(51) Int. Cl.
    *E04D 13/18* (2006.01)
(52) U.S. Cl. ............. 52/173.3; 52/549; 52/551; 52/552; 52/656.1
(58) Field of Classification Search ............ 52/549–552, 52/478, 541, 533, 510–511, 656.1, 535–536, 52/544, 546, 173.1, 173.3, 200
See application file for complete search history.

(56) References Cited

U.S. PATENT DOCUMENTS

| | | | |
|---|---|---|---|
| 5,274,978 A | | 1/1994 | Perkonigg et al. |
| 5,460,660 A | | 10/1995 | Albright et al. |
| 5,642,596 A | * | 7/1997 | Waddington .................. 52/546 |
| 6,370,828 B1 | * | 4/2002 | Genschorek .................. 52/200 |
| 6,465,724 B1 | * | 10/2002 | Garvison et al. .............. 136/244 |
| 6,928,781 B2 | * | 8/2005 | Desbois et al. ................. 52/551 |
| 6,959,517 B2 | * | 11/2005 | Poddany et al. ............. 52/173.3 |
| 7,012,188 B2 | * | 3/2006 | Erling ............................ 136/251 |
| 7,600,349 B2 | * | 10/2009 | Liebendorfer ............... 52/173.3 |
| 2004/0000334 A1 | * | 1/2004 | Ressler ......................... 136/251 |
| 2004/0154655 A1 | * | 8/2004 | Tanaka .......................... 136/244 |
| 2004/0187909 A1 | * | 9/2004 | Sato et al. ..................... 136/251 |
| 2004/0221886 A1 | * | 11/2004 | Oono ............................. 136/251 |
| 2007/0131273 A1 | | 6/2007 | Kobayashi |

FOREIGN PATENT DOCUMENTS

| | | |
|---|---|---|
| DE | 36 11 542 | 10/1987 |
| DE | 10 2004 044 103 | 4/2005 |
| DE | 10 2006 053 831 | 5/2008 |
| EP | 1 798 776 | 6/2007 |
| WO | WO 2006/086808 | 8/2006 |

* cited by examiner

*Primary Examiner* — Brian Glessner
*Assistant Examiner* — Beth Stephan
(74) *Attorney, Agent, or Firm* — Jordan and Hamburg LLP

(57) ABSTRACT

A fastening device for flat components, especially solar modules, to be arranged on a framework, includes a first profile mounting rail and a second profile mounting rail that are spaced apart from one another and that are arranged horizontal and parallel on the framework and on which one component can be affixed in the area of its mutually opposing edges. Profile elements, which are arranged on the bottom of a frameless component in the area of the lateral edges, are provided with a retaining rib which projects toward the lateral edge, and connect to the profile mounting rails. A retaining element is provided with a first fastening segment for fastening to a fastening area of the profile mounting rail and with a second fastening segment having two retaining segments that project to both sides and that, in the assembled position, overlap the mutually opposing retaining ribs of two components to be placed next to one another.

16 Claims, 6 Drawing Sheets

FASTENING DEVICE FOR FLAT COMPONENTS, ESPECIALLY SOLAR MODULES, TO BE ARRANGED ON A FRAMEWORK

BACKGROUND OF THE INVENTION

The invention relates to a fastening device for flat components, especially solar modules, to be arranged on a framework, and includes a first profile mounting rail and a second profile mounting rail that are spaced apart from one another and that are to be arranged horizontal and parallel on the framework, and on which one component can be affixed in the area of its mutually opposing edges.

Flat components such as, for instance, solar modules or solar collectors, etc., are normally arranged outside, whether free-standing or on the roofs of houses, on a framework. The framework itself is normally anchored in the ground or on the roof and comprises, for instance, appropriate lateral guides formed from appropriate profile rails, to which the components are fixed via a suitable fastening device. Such a fastening device normally includes two parallel profile rails that are to be arranged parallel to, and spaced apart from, one another on the framework and that extend between the framework segments. The components are fixed to these profile rails at their edges or by using fastening means. Normally, screw fastenings are used, that is, suitable retaining units that are securely screwed to the profile rails and fixed in a suitable manner, frequently using screw connections, as well. In this manner, each individual component is fastened or screwed on individually, which is very complex during assembly and also during disassembly, for instance, if one component must be exchanged because of a defect.

German patent application 10 2006 053 831, published subsequently, describes a fastening option that is much more simple in comparison. In it, a simply embodied retaining sheet is used that is inserted into an undercut groove on a profile rail and rotated, and that has a retaining segment that laterally overlaps the frame of a component. The retaining sheets are merely inserted or rotated in, which facilitates very simple fastening and thus simple construction of the entire arrangement, and exchanging a component should also be simple. The requirement for this type of fastening is that each component has a frame that is overlapped by the retaining part. For instance, in the case of a solar module it would not be possible to place the retaining part directly on the upper glass plate since this could cause damage to the latter. The presence of the frame and the circumstance that the mounting sheet in the assembled position is arranged between the frames so that in the assembled position they are spaced apart by a few millimeters or centimeters is disadvantageous in that this reduces the maximum possible active surface area on the solar modules that can be placed on the given base surface area. Relative, for instance, to the surface area of the roof of a house, this mandatory spacing between the individual modules, whether in the vertical or horizontal, leads to that fact that far less module surface area can be placed than would be available for base surface area.

The underlying problem of the invention is to provide a fastening device that permits very close adjacent arrangement of flat components, in particular solar modules.

SUMMARY OF THE INVENTION

For solving this problem, in a fastening device of the type cited in the foregoing, it is provided that profile elements arranged on the bottom of a frameless component in the area of at least one part of the lateral edges are provided with a retaining rib, which projects toward the lateral edge, and connects to the profile mounting rails, and that for connecting a profile element to the first profile mounting rail, a retaining element is provided that has a first fastening segment for fastening to a fastening area of the profile mounting rail, and that has a second fastening segment having two retaining segments that project to both sides, and that in the assembled position, overlap the mutually opposing retaining ribs of two components to be placed next to one another.

In the fastening device according to the invention, only frameless components are used, that is, for instance, solar modules, as opposed to the prior art, which provides exclusively for components having surrounding frames. In contrast, in the inventive fastening device, the only profile elements provided are arranged on the bottom on the components, and they project minimally, preferably approximately 1-2 mm, over the lateral edges of the components and thus prevent, e.g., in the case of solar modules, the glass panes from being able to be placed against one another. The profile elements have a retaining rib that is preferably oriented toward the lateral edge and that cooperates with a retaining element, which itself is detachably fastened to a profile mounting rail. However, the retaining rib could also stand, e.g., vertically on the edge of the profile element, so that its upper free edge cooperates with the retaining element. The retaining element itself has a first fastening segment for fastening to the profile mounting rail and a second fastening segment with which it cooperates with each retaining rib for the two adjacent components. The components are thus fixed to the profile mounting rails, and thereby to the framework exclusively in the area beneath the components, since the clamping overlap of the retaining segments via the retaining ribs of the profile element occurs in the area beneath the components. The latter can therefore be positioned with the maximum proximity to one another, i.e., they can be positioned directly against one another, thus even touching one another. This consequently makes it possible to fully utilize the available base surface area, since when using the inventive fastening apparatus there is no mandatory spacing between the components due to enclosing frames being present, and there are no retaining elements to be placed between the components. The arrangement of the profile element or elements on the bottom of the component furthermore does not reduce the active surface area of the component embodied as a solar module, in contrast to the situation with surrounding component frames, in which the frames overlap the edges of the top of the component, and thus reduce the size of the active surface area.

It is fundamentally possible to fasten one component to the first profile mounting rail and to the second profile mounting rail via such retaining elements. In accordance with the invention it is particularly useful, however, to fasten the components only to the first profile mounting rail via such retaining elements and for fixing to the second profile mounting rail to provide another retaining option that likewise uses the presence of the retaining rib, disposed beneath a component, and the profile element for a plug-in clamping retaining unit in connection with a corresponding clamp receiving element on the second profile mounting rail, and more detail will be provided in this regard in the following.

The profile elements arranged on the bottom of the component are usefully profile rails that extend vertically and horizontally, and that are either mitered and joined to one another in the area of their corners by means of preferably interior corner connectors, or that are joined to one another using corresponding profile connectors that join them at the corners and that then form profile elements, since the profile mounting rails are fixed in the area of the corners. In any case, the profile rails have a stabilizing function, since in accordance with the invention, the components are frameless. This prevents the components from being bent too severely in the assembled position, whether in the vertical or horizontal direction.

The retaining element itself is largely T-shaped and has a longitudinal leg and a transverse leg that is arranged thereon and that forms the two retaining segments, i.e., the transverse leg overlaps the corresponding retaining ribs of the adjacent profile element on both sides. The retaining element can be a single part or can have multiple parts. Each profile mounting rail to which the retaining element is fastened, the retaining element being a few millimeters thick, preferably 1-5 mm, in particular 2 mm, in the area of the longitudinal and transverse leg, preferably has an undercut groove for the fastening area, while the first fastening segment is embodied on the retaining element as a hook segment via which in the assembled position the retaining element can be hooked to the undercut grooves. The groove is preferably embodied as a double undercut T-groove, and the hook segment is preferably embodied in a corresponding T shape matching the groove shape. This permits simple placement, insofar as the hook segment must merely be placed into the groove from above and then rotated in order to fix it securely. The retaining element can be displaced longitudinally in the groove, that is, can be placed at a desired location with nothing further and moved into position and thus can be caused to overlap the retaining rib of a profile element.

In terms of assembly, a first component is fixed, whereupon the retaining element or elements on it are positioned while overlapping the retaining rib, and then the second component is moved thereagainst. In doing so, when moving the lateral edges of two adjacent components against one another, in order to prevent them from striking one another directly on their lateral edges, which are largely formed by the exposed glass plate edge in the case of a solar module (provided this is not already assured by the profile elements that project laterally approximately 1-2 mm), usefully provided in the assembled position on one retaining element is at least one stop opposing the adjacent profile element and against which each component is positioned using its profile element, and via which they, and thus the components, are spaced apart from one another in a defined manner. The stop is designed and positioned such that the profile elements run against it and at the same time the lateral edges of the components are positioned as desired as close as possible to one another.

Since solar modules are normally arranged on an incline, one useful refinement provides on the first fastening area of a profile mounting rail, a preferably rib-shaped stop for the profile element or elements arranged in the area of the lower component edge. When arranging a component, it is, for instance, first fixed in the area of its upper edge in the preferred manner described in the following, since the lower edge of the component is lowered until the profile element or elements are disposed on the profile mounting rail and are positioned against the rib-shaped stop with the path blocked, the stop preventing further slipping, so that fixation occurs in a simple manner using the retaining elements.

As described, there is fundamentally the possibility for fixing the components in the area both of the lower edge and of the upper edge using a described retaining element. However, one useful inventive embodiment provides for undertaking this only in the area of the lower edge for fixing to a first profile mounting rail, and provides for a different fastening option in the area of the upper component edge for fastening to the second profile mounting rail. To this end, the possibly second profile mounting rail has a second fastening area in the form of a largely C-shaped receiving groove that is open toward the component edge, and in which engage(s) the retaining rib of the profile element or elements there, which are overlapped by a leg of the receiving groove. In this case, a simple plug-in clamp retaining unit occurs in that the projecting retaining rib of the edge of the profile element is inserted into the open receiving groove, so that the retaining rib is overlapped by the receiving groove shoulder and is fixed against lifting. As such, during assembly, the profile element segment with the retaining rib must merely be inserted into the receiving groove from below, whereupon the component is lowered until the lower profile element or elements are seated on the lower profile mounting rail and run against the stop rib there, whereupon fixation can occur immediately via the retaining element.

One particularly useful refinement provides that the first and the second fastening areas are embodied on each mounting rail, i.e., the rails are embodied identically to the extent that a total of only one profile must be on hand that offers the two inventive fastening possibilities.

In accordance with one useful refinement of the invention, in the assembled position, the first fastening area is arranged higher than the second fastening area. As described, fixation via the profile elements always occurs in the area of the retaining rib that projects laterally or vertically. The latter is always in the same position relative to the bottom of a component because it is circumferential. If the first fastening area is now disposed higher than the second fastening area, this necessarily means that in the assembled position the lower area, relatively speaking, of the component, which is arranged on the first fastening area, is disposed somewhat higher than the upper edge area, which is fixed on the second fastening area. This offers the particularly advantageous possibility of overlapping with one another two components that are arranged one above the other. Due to the height offset of the two fastening segments, the upper edge area of a lower component can be urged and arranged under the lower edge area of an upper component. As a result, the lower edge area of the upper component somewhat overlaps the upper edge area of the lower component, so that a scale-like arrangement (seen vertically) can be created with there simultaneously being the possibility for a nearly directly adjacent arrangement horizontally. This now provides the possibility for using such components as a sort of replacement roofing tile, that is to cover the roof using these components themselves (in-roof design).

In particular, in such an arrangement, but also when the components are not offset and overlapped but are arranged plane-parallel, it is useful to provide on the profile element that runs horizontally on the bottom in the assembled position and that is embodied as a profile rail a sealing element that continues when needed in the profile connector provided when needed, and against which in the assembled position, the edge of the component arranged therebeneath is positioned. This advantageously facilitates sealing in the area of the horizontal gap between two components.

In order to provide a sealing option in the longitudinal direction, as well as to avoid moisture being drawn downward by the capillary gap that results with the (nearly) touching components in the area of the longitudinal lateral edges, usefully provided between two mutually opposing profile elements is a profile component that extends longitudinally relative to the assembled position, and that runs beneath the transition gap between two adjacent components, and that where necessary also provides stiffening. This profile component can be made of plastic or metal, for instance, and extends across the length of a long, rectangular component (the length of which is for instance approximately 1.7 m, while the width is approximately 1 m). The profile component runs precisely beneath the resulting narrow gap and also receives penetrating drops of water and conducts them downward, where they can be drained off due either to the continuation of the profile component to the next component, or due to the overlapped arrangement.

In any case, usefully provided on each profile element, is a laterally open receiving or clamping segment for a clamping segment of the sealing element or of the lateral leg of the profile component. Using this, it is possible to attain simple fixation of the sealing element, for instance, a rubber sealing element that is sufficiently deformable and has, for instance, a sealing lip or the like, or of the profile component that can be embodied as a metal part, or even as a sufficiently stiff plastic part.

In order to ensure certain support of the profile elements on the profile mounting rails, usefully provided on at least one part of the support surfaces of the profile elements, is a toothed or scored surface structure.

Furthermore, a profile element, in particular when it is embodied as a profile rail, can have at least one hollow chamber in which a stiffening element is arranged. This stiffening element comprising, e.g., metal, preferably aluminum (like the profile element itself), stiffens the entire component in order to prevent longitudinal and transverse bending.

In addition to the fastening device itself, the invention furthermore relates to a component group, in particular a solar module group, that is arranged on a framework, and in which a plurality of adjacently arranged, frameless components are combined using a fastening device of the type described to create a compound unit. For this, in the inventive component group, it is merely necessary to provide an anti-theft element on the exterior components, since the interior components are arranged securely on the other component edge via the retaining elements and the preferred clamping fixation and cannot be removed without releasing the anti-theft device.

Additional advantages, features, and details of the invention result from the exemplary embodiment described in the following and using the drawings.

DETAILED DESCRIPTION OF THE INVENTION

Figure 1:
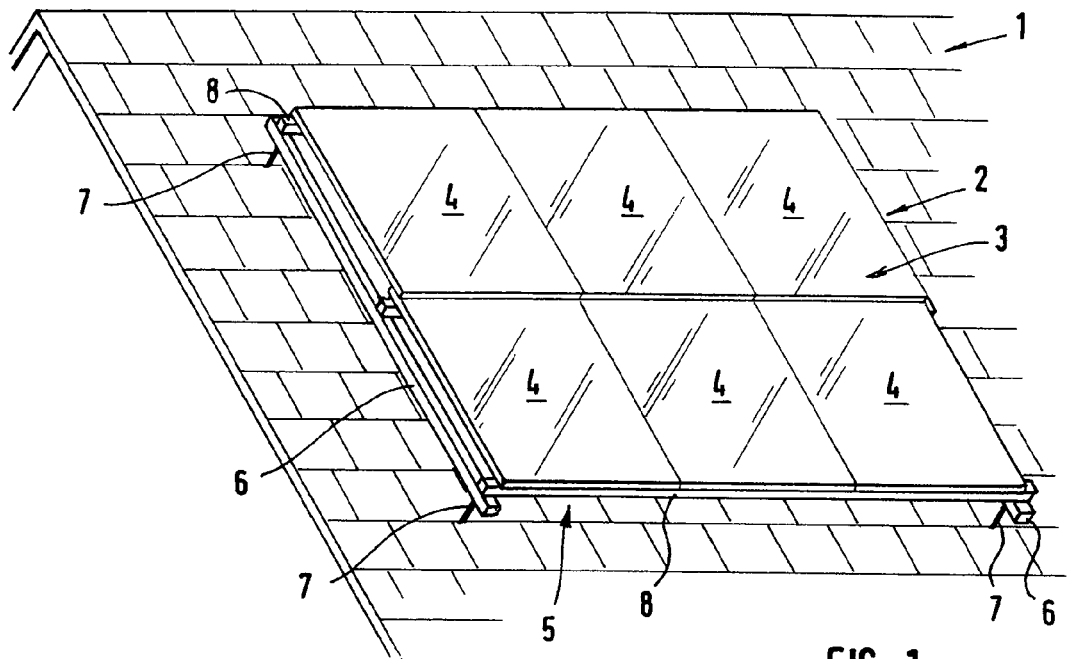
FIG. 1 depicts the principle for an inventive component group in the form of solar modules, mounted on the roof of a house.

FIG. 1 depicts the principle of a component group 2 arranged on a house roof 1 and including, merely as an example, six components 3, e.g., in the form of solar modules 4 including a plurality of solar cells for producing energy. Provided for retaining the solar modules 4, is a framework 5 that includes two rails 6, running vertically in this case, that are fixed to the roof via corresponding roof retaining elements 7. Two profile mounting rails 8 are arranged on the rails 6 of the framework via fastening means (not shown in greater detail). The two profile mounting rails 8 run spaced apart from, and parallel to, one another and cross the rails 6 horizontally. As will be explained in greater detail in the following, they are part of a fastening device for the solar modules 4, which are themselves fastened to the profile mounting rails 8 via suitable profile elements and retaining elements. At this point it should be noted that, of course, far more than six solar modules can be arranged adjacent to one another, and also more rows can be arranged above one another, depending on the size of the surface area covered.

Figure 2:
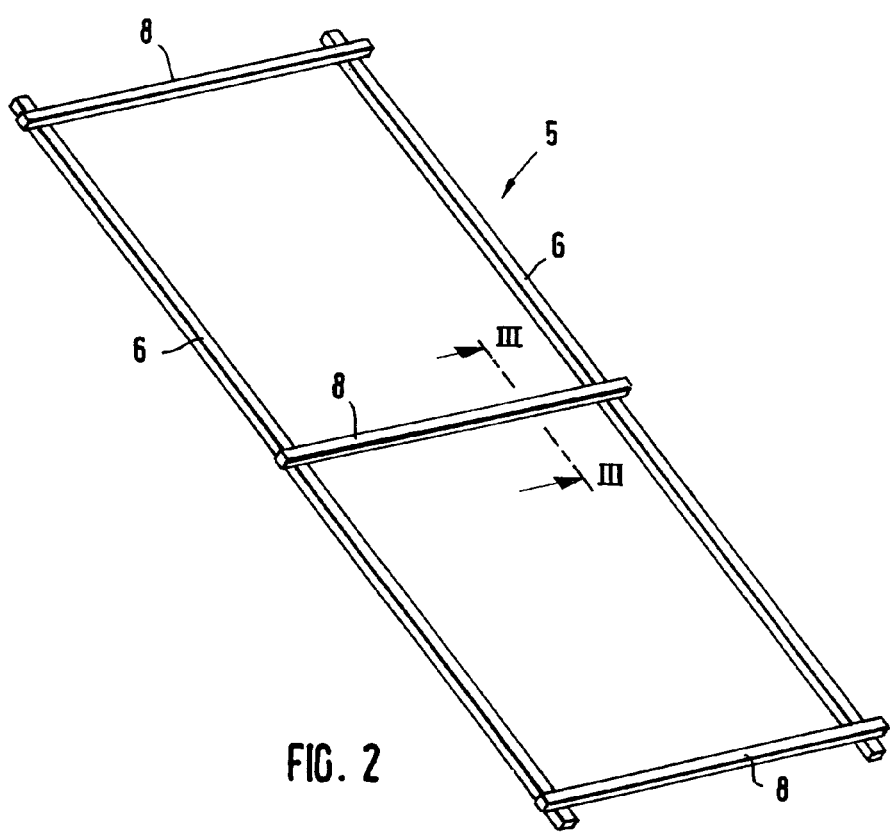
FIG. 2 depicts the framework with the profile mounting rails arranged thereon.
Figure 3:
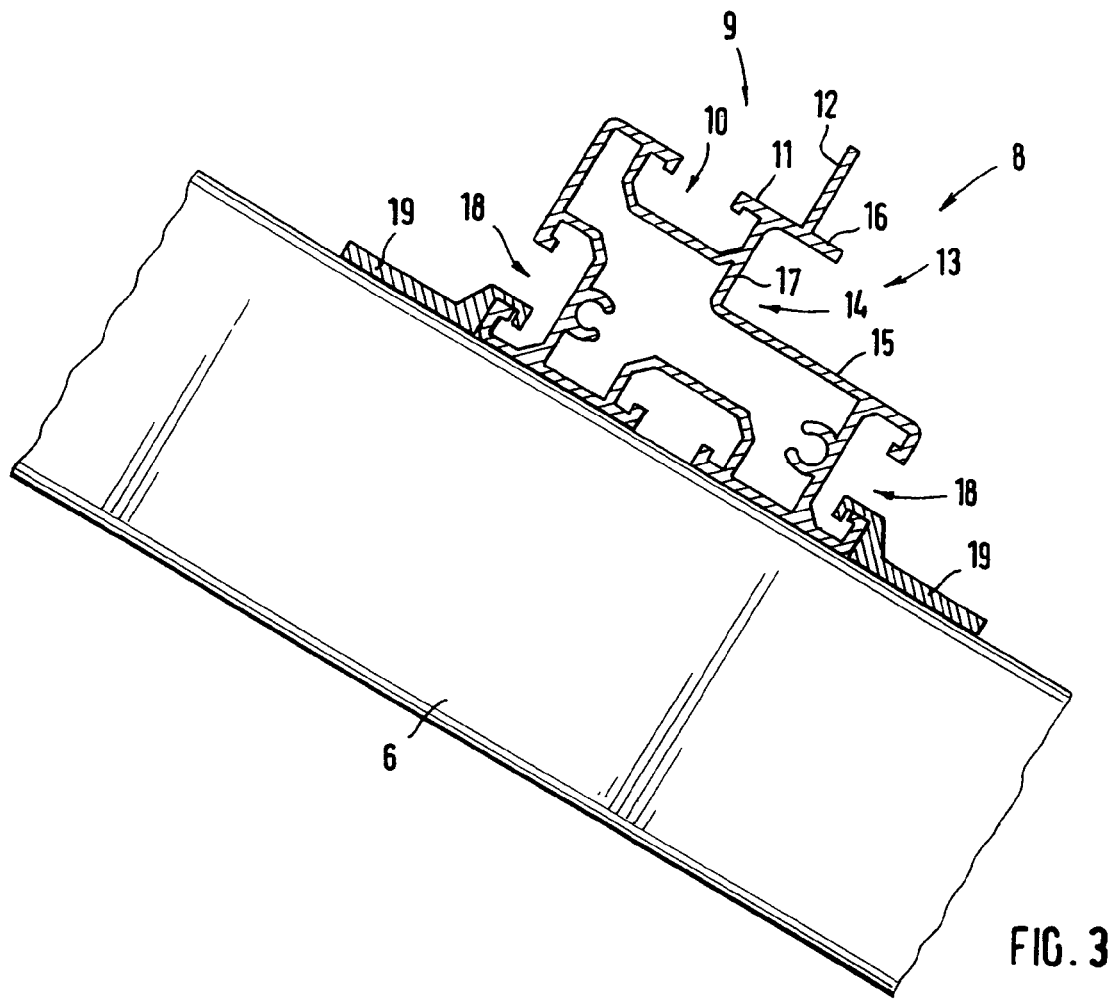
FIG. 3 is a segment through a profile mounting rail along the line III-III in FIG. 2.

FIG. 2 provides a better view of the framework 5 with the rails 6 and the securely screwed profile mounting rails 8 that are arranged thereon, three of which are depicted in the example shown. Two profile mounting rails 8 are used for fastening one component 3, that is, each solar module, so that, relative to such a solar module, one profile mounting rail represents the first profile mounting rail and the other profile mounting rail represents the second profile mounting rail. The profile mounting rails are all embodied identically. FIG. 3 depicts a sectional view through such a profile mount 8. In order to be able to fasten two vertically adjacent components 3 or solar modules 4 to such a profile mounting rail 8, as is the case proceeding from the example in accordance with FIG. 2 with the center profile mounting rail 8, embodied on each profile mounting rail 8 are two fastening areas. These include a first fastening area 9 comprising a groove 10, T-shaped in this case, that is, undercut on both sides, a supporting surface 11, and a stop 12 limiting the latter, and a second fastening area 13 in the form of a receiving groove 14 that is open to the side, largely C-shaped in cross-section, and that has a lower supporting leg 15 and an upper leg 16 and a groove base 17. As can be seen, the two fastening areas 9 and 13 are offset in height, wherein the fastening area 9 is higher than the fastening area 13. Moreover, FIG. 3 depicts the fastening of a profile mounting rail 8 to a rail 6 of the framework. For this, two lateral T-grooves 18 are provided in which corresponding clamping sheets 19 engage, that are themselves fastened to rails 6 via fastening screws (not shown).

Figure 4:
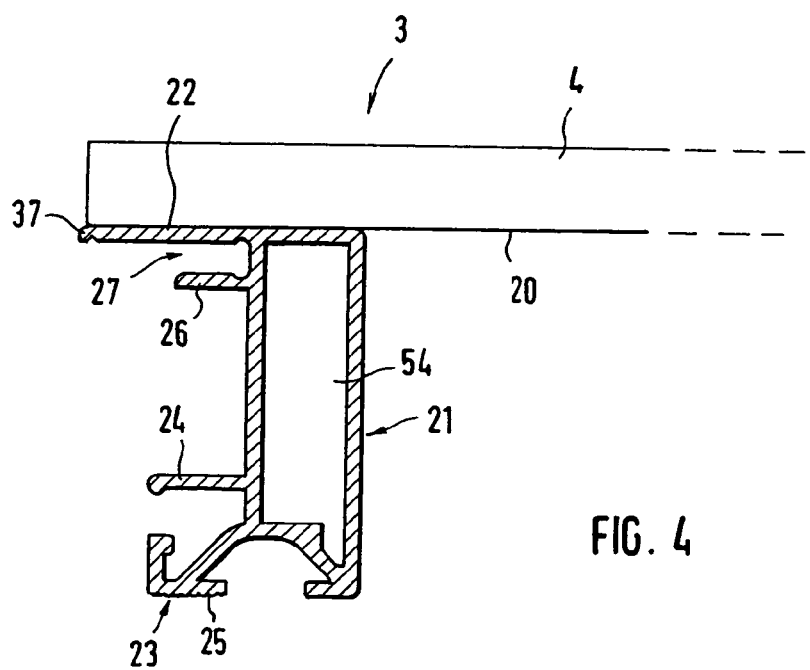
FIG. 4 is a segment through a profile element for depicting its basic structure.

FIG. 4 depicts a partial view of a component 3, in this case a solar module 4 in the area of one of its edges, wherein this can be either a lateral edge or the upper or lower component edge. Arranged on, normally glued to, the bottom 20 of the solar cell module 4 is a profile element 21, the profile element 21 having a flat upper retaining leg 22 for this purpose. The profile element 21, which like a profile mounting rail is also embodied as a hollow chamber profile made of metal, preferably aluminum, furthermore has a profile segment 23 in the area of its lower end having a laterally projecting retaining rib 24 that runs parallel to a lower rib 25 of the profile segment 23. Furthermore provided is another rib 26, forming a groove 27 that receives a stiffening and sealing profile component, which will be described in greater detail in the following. A stiffening element (e.g., made of metal) that extends across the length of the profile element, which is preferably a rail, can be arranged in the hollow chamber 54.

Figure 5:
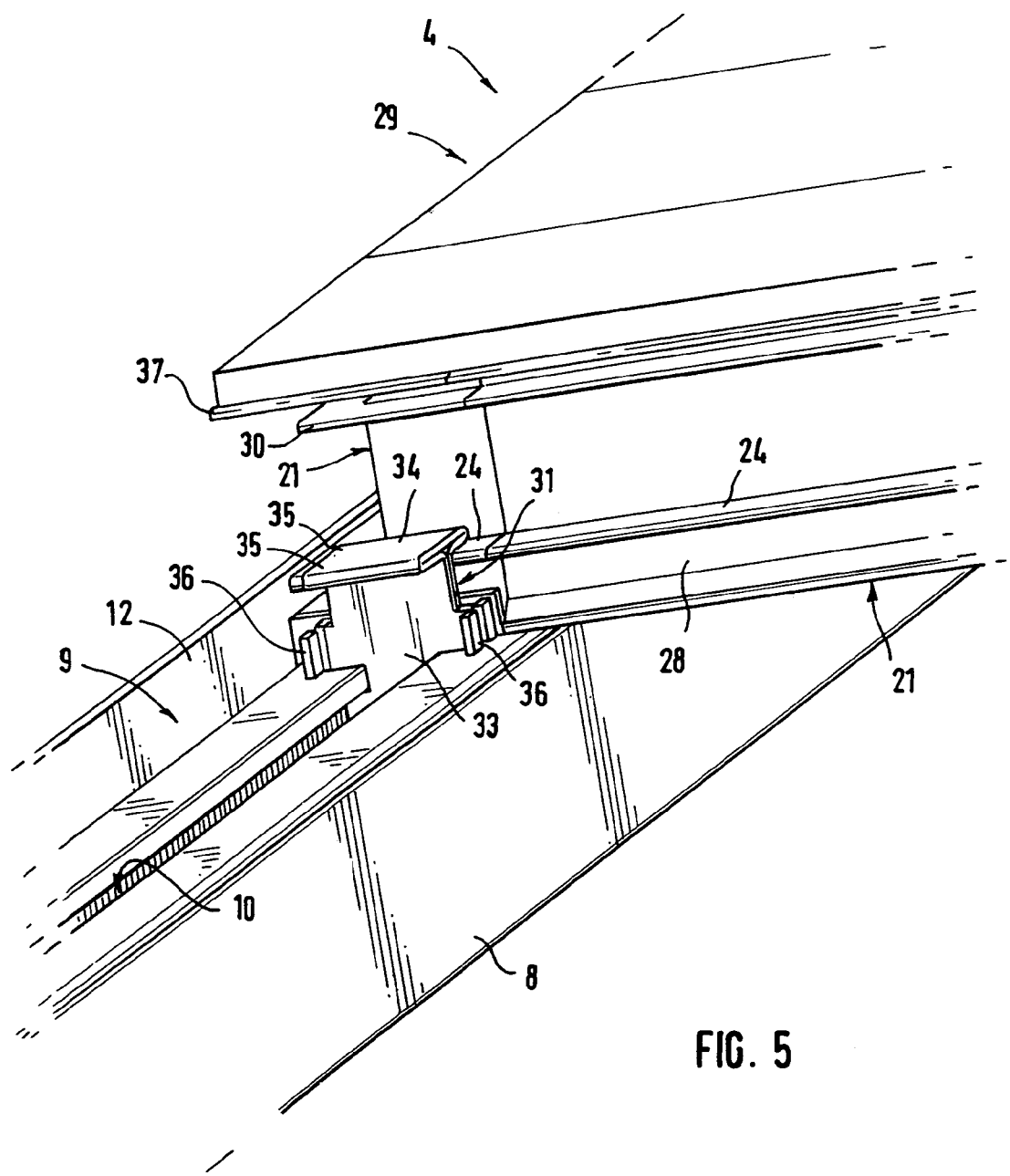
FIG. 5 is a view of a component in the form of a solar module, with profile elements arranged therein in the area of its lower edge in the assembled position on a profile mounting rail having a retaining element.
Figure 6:
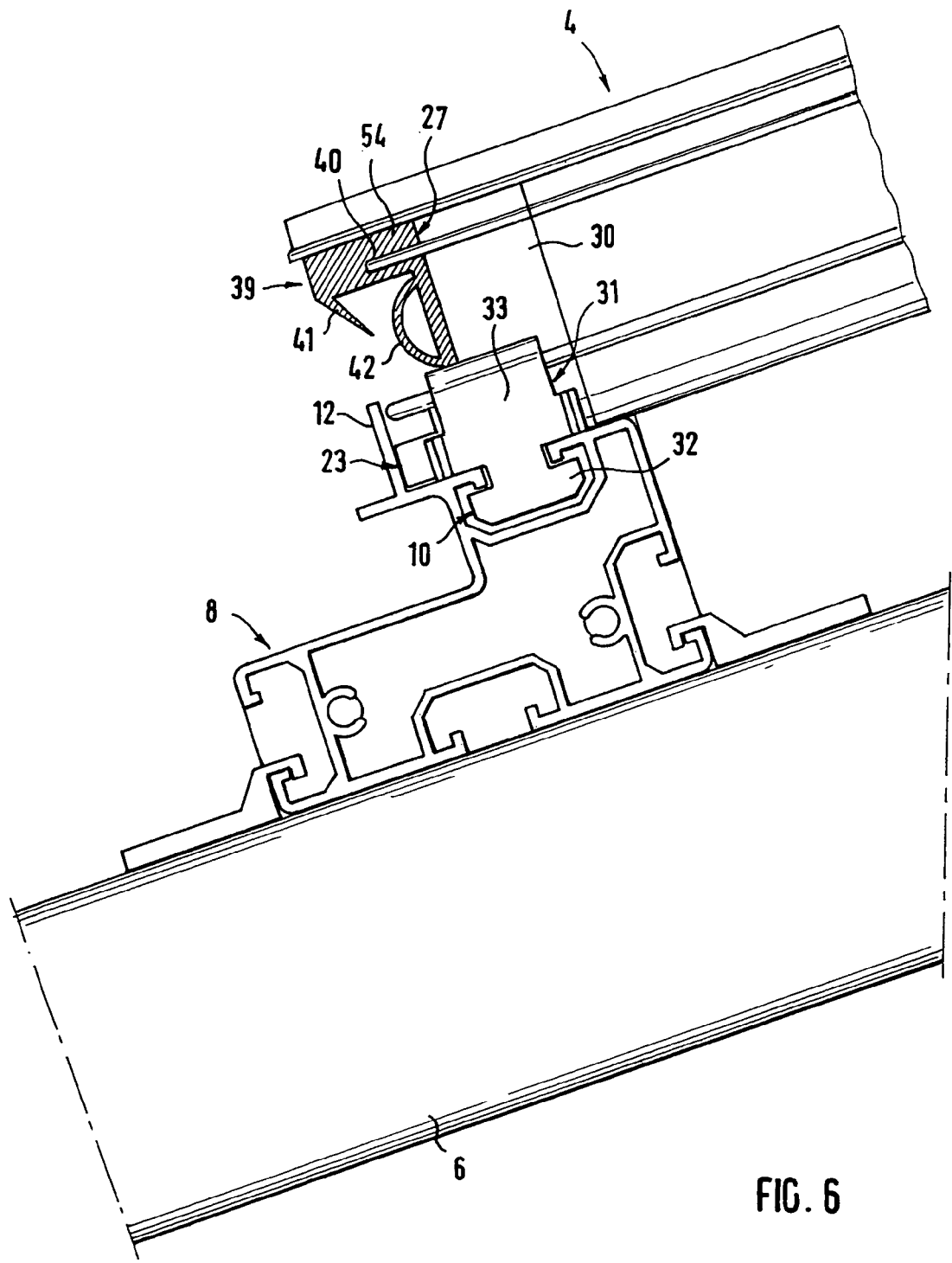
FIG. 6 is a side view, in partial section, of the arrangement from FIG. 5.

FIGS. 5 and 6 now depict the fastening of a solar module 4 in the area of the lower edge to a profile mounting rail 8. Arranged below the solar module 4 in the depicted example is a first profile element 21 in the form of a profile rail 28 that extends across the entire vertical length of the solar cell module 4. A profile element also embodied as a profile rail (not shown in greater detail) is arranged on the horizontally running side 29. The two profile rails 28 are connected via a profile connector 30 that continues the respective profile rail shape and that also forms a profile element 21. The profile connector 30 and also the horizontally running profile rail (not shown in greater detail) each have a profile segment 23 that meets the stop rib 12 of the first fastening segment 9. This limits the downward movement of the solar module that stands on an incline in the assembled position.

Used for fixing is a retaining element 31 that has a lower T-shaped hook segment 32 (see FIG. 6) to which a longitudinal leg 33 is connected, and connected thereto is a transverse leg 34 that forms two lateral retaining segments 35. Furthermore provided are two lateral stops 36.

The retaining element 31 that is embodied flat in the area of its longitudinal leg, that is, sheet-like with a thickness of 2-5 mm, is now inserted from above into the groove 10 with the hook segment 32 in a position rotated 90° relative to FIGS. 5 and 6 and then rotated 90° into the position depicted in FIGS. 5, 6. Then, the hook segment 31 is urged against the solar module 4 until the two stops 36 are positioned at the lower leg 25 of the profile segment 23 of the profile connector 30, the one retaining segment 35 having overlapped the retaining rib 24 in this position so that in this manner a clamping overlap is created in connection with the hook segment 32, thus preventing the solar module from being lifted.

For assembling the next solar module 4, the lower edge area or the profile element 21 of the latter provided there (profile rail 28 and profile connector 30) is placed in a corresponding manner onto the first fastening segment 9 and guided against the stop rib 12 and then urged against the solar module 4 that is already arranged. The corresponding profile segment 23 of the profile connector 30 which is disposed against the adjacent solar module side and which, in the depicted embodiment has, in the area of the profile segment 23, a short vertical rib 53, runs against the other side of the stops 36 of the retaining element 31 that has already been placed, the retaining rib 24 of the profile connector 30 there is urged under the second retaining segment 35 of the retaining element 31 so that this component is also secured fast in its position. The embodiment of the retaining element 31, in particular the length of the stops 36, is dimensioned such that the two longitudinally running narrow edge projections 37 of the adjacent profile elements 21, which project approximately 1-2 mm laterally and prevent the glass edges of the modular glass plates from being positioned against one another, are spaced only minimally apart from one another or are positioned directly against one another.

Figure 7:
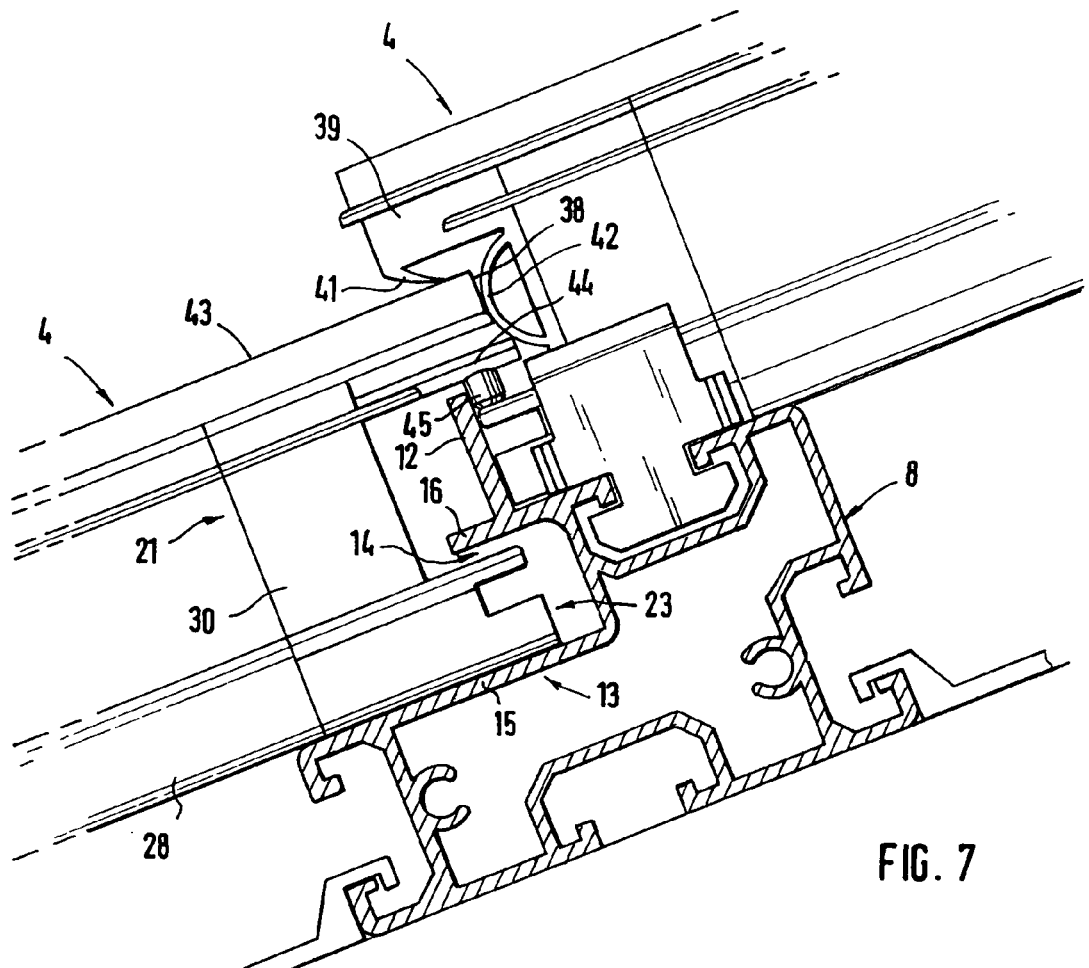
FIG. 7 is a side view of the component from FIGS. 5 and 6 in the area of its upper component edge in the assembled position on the second profile mounting rails and also depicts the other component mounted on this profile mounting rail.

While FIGS. 5 and 6 depict how the lower component edge is fixed, FIG. 7 depicts how the upper component edge is fixed. A profile element 21 (not shown in greater detail here) that is in the form of a profile rail 28 and that also runs parallel to the component edge 38 in the area of the upper edge is also arranged beneath the solar module 4 and is itself connected to the vertically running profile rail 28 via a profile connector 30, which also represents a profile element 21. For mounting a solar module 4, first the lower edge of the profile connector 30 and of the horizontally running profile rail 28 with the respective profile segments 23 is placed onto the supporting leg 15 of the second fastening segment 13 and then urged slightly upward until the profile segment 23 is received in the C-shaped receiving groove 14 and overlapped by its leg 16. The lower component edge is placed onto the first fastening segment 9 of the profile mounting rail 8 disposed thereunder and guided against the stop 12, as described for FIGS. 5 and 6. In any case, the profile segment 23 of the profile connector 30 and of the horizontally running profile rail 28 remains in the C-shaped receiving groove 14, however, so that in this case as well, there is protection against unintended lifting. There is no further fixing in the area of the upper component edge, merely horizontal displacement, which will be explained in the following.

FIG. 7 furthermore depicts how a first solar module 4 cooperates with a second solar module 4 arranged above it in a layer-like manner. Arranged on the upper solar module 4 is a sealing element 39 that extends across the entire width horizontal width (see also FIG. 6). It is arranged on the horizontally running profile elements, that is, the profile connector 30 and the horizontally running profile rail 28 (not shown). Fixation occurs in the groove 27, which acts as a clamping groove. The sealing element 39 has a corresponding slit 40 that forms a clamping segment 54 that is inserted into the clamping groove 27. Furthermore a sealing lip 41 that projects downward and a sealing loop 42 are provided on the interior.

As FIG. 7 depicts, the solar module 4 is urged under the sealing element 39, the sealing lip 41 deforming and being sealingly positioned against the top 43 of the lower solar module 4. This creates linear sealing in the horizontal direction. The upper solar module 4 thus overlaps the lower solar module 4 so that a scaled, shingle-like arrangement results. The lower solar module 4 can also compress the sealing loop 42 so that a linear seal occurs there as well, depending on how far the solar module 4 is urged in the direction of the upper module.

As FIG. 7 furthermore depicts, a profile component 44 that extends vertically below the transition slit between two adjacent solar modules 4 (which will be explained in greater detail in the following) runs toward the sealing loop 42. The profile component 44 can be fixed via a projection 45 (e.g., an inserted pin) that engages the stop rib 12.

Figure 8:
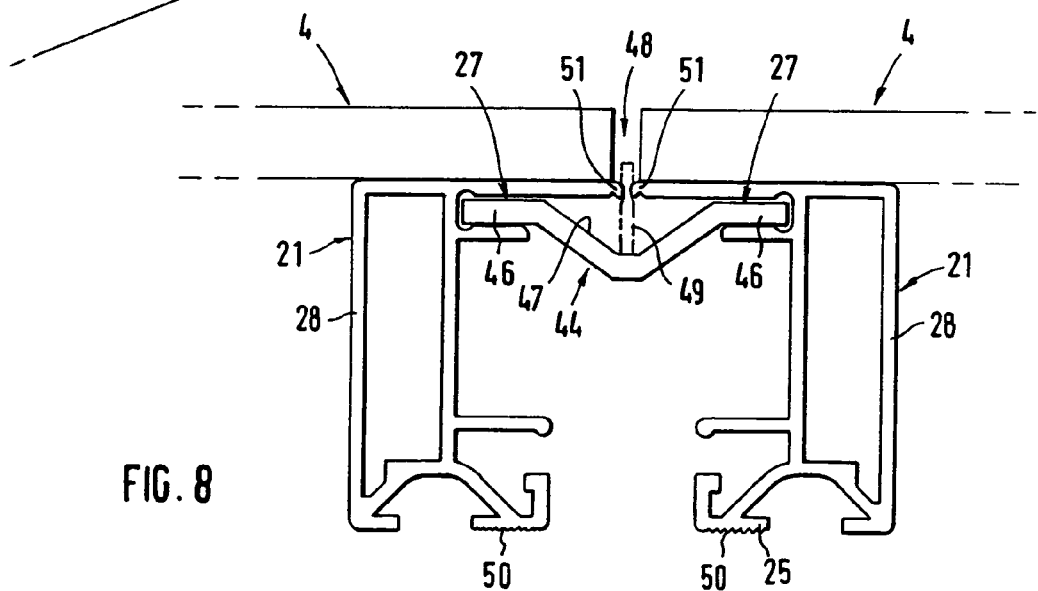
FIG. 8 is a view of two mounted components that are arranged adjacent to one another in the area of their adjacent longitudinal edges with inserted profile component.

FIG. 8 depicts such an arrangement of the profile component 44 acting as seal between two profile elements 21, in this case, for instance, between two profile rails 28, of two adjacent solar elements 4. The cross-section of the profile component 44, which is, for instance, plastic, has a trough-like shape. It seals any gap 48 remaining between the components. It engages in the grooves 27 of the profile rails 28 via two lateral segments 46. As can be seen, the depression 47 that results from the trough-like shape is disposed beneath the potential very narrow gap 48 between the immediately adjacent lateral edges of the two solar modules 4 or the edge projections 37. Any moisture that penetrates through this gap 48 collects in the depression 47 and, since the arrangement is on an incline, runs downward, where it can be drained off. For this purpose, the depression 47 can open somewhat above the solar module disposed therebeneath (the sealing element 39 could be interrupted in this area). As shown with the broken line, it is also conceivable to mold on the profile component 44 a sealing rib 49, for instance, made of a soft plastic material that, in the assembled position in the gap 48, seals the latter.

Figure 9:
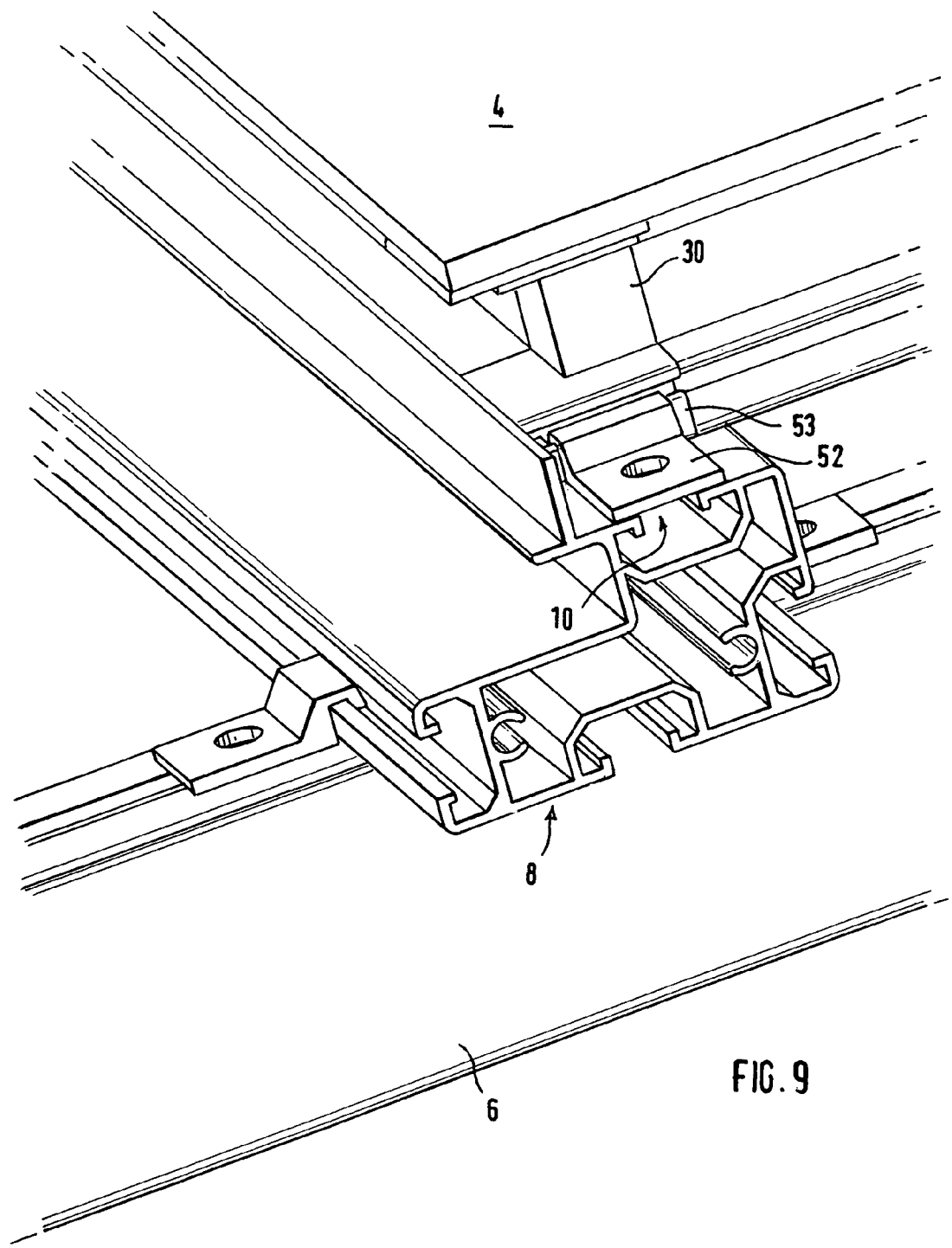
FIG. 9 is a view of the exterior component in the area of its outer edge for depicting assembly on the edge.

As can furthermore be seen from FIG. 8, a profile element 21, in this case shown on the leg 25, has teeth 50 that are used to attain improved seating on a profile mounting rail 8. Two drip edges 51 are also depicted on the upper leg 22. The described manners of fixation still permit two components arranged above one another or one component group to be displaced horizontally. In order also to fix against this the entire group or one horizontal component row, the outermost right-hand and outermost left-hand component of a row are securely connected in the area of their lower component edge and their upper component edge to that of the profile mounting rail 8 (see FIG. 9). To this end, a claw-like retaining component 52 is provided that overlaps the vertical rib 53 of the profile connector 30 that is provided on its lower end and that is part of the profile segment 23 there, and the retaining component 52 is then anchored in the groove 10 via a suitable fastening screw and T-nut, it being possible to construct antitheft elements thereover.

Instead of an arrangement of profile connectors 30 that form profile elements 21 themselves, it is also possible to miter the profile rails in the corner area of a component and to connect them using an interiorly disposed simple corner connector by pressing. A surrounding frame on the bottom is then formed from only four profile rails with the interiorly disposed corner connectors.

The invention claimed is:

1. A fastening assembly for arranging frameless flat components on a framework, comprising:
    a first profile mounting rail and a second profile mounting rail that are spaced apart from one another and that are to be arranged in a horizontal and parallel orientation on the framework and on each of which a first frameless flat component is affixable at respective areas of mutually opposing edges of the first frameless flat component;
    for each one frameless flat component of said arranged frameless flat components, profile elements arranged on a bottom of said one frameless flat component, each one of said profile elements including a retaining rib at a lateral edge; and
    a retaining element distinct from the first and second profile mounting rails and that has a first fastening segment for fastening the retaining element to a first fastening area of one of said first and second profile mounting rails, and that has a second fastening segment for fastening adjacent frameless flat components, the second fastening segment having two retaining segments,
    wherein said retaining element is generally T-shaped having a longitudinal leg forming the first fastening segment and a transverse leg forming the second fastening segment, said transverse leg extending toward each of the adjacent frameless flat components while the adjacent frameless flat components are installed to overlap the respective retaining rib of each of the adjacent frameless flat components;
    wherein said one of said first and second profile mounting rails includes an undercut groove forming a portion of said first fastening area; and
    wherein said first fastening segment of said retaining element has a hook segment movable within the undercut groove during installation and by which said retaining element is retained in said undercut groove while in the assembled position.

2. A fastening device assembly according to claim 1, wherein said profile elements are profile rails or profile connectors that join the profile rails at corners thereof.

3. A fastening device assembly according to claim 1, wherein:

said groove is embodied as a double undercut T-groove; and
    said hook segment is embodied in a corresponding T shape matching a shape of the T-groove.

4. A fastening assembly according to claim 1, further comprising a stop provided on said retaining element opposing an adjacent one of said profile elements when in the assembled position.

5. A fastening device assembly according to claim 1, wherein, provided on said first profile mounting rail is a rib-shaped stop for abutting one of said profile elements at a lower edge portion of one of said frameless flat components.

6. A fastening assembly according to claim 1, wherein one of said first and second profile mounting rails has a second fastening area in a form of a generally C-shaped receiving groove that is open toward an edge of a received frameless flat component and which engages a rib of a profile element arranged on a bottom of said received frameless flat component, wherein said engaged rib is overlapped by a leg of said receiving groove.

7. A fastening assembly according to claim 6, wherein said first and said second fastening areas are embodied on each of said first and second profile mounting rails.

8. A fastening assembly according to claim 6, wherein, in the assembled position, said first fastening area is disposed higher than said second fastening area.

9. A fastening assembly according to claim 1, wherein, for a first frameless flat component of said arranged frameless flat components a sealing element is provided at a first profile element of said profile elements and embodied as a profile rail extending horizontally, said sealing element continuing in said first profile, element, and against which, in the assembled position, an edge of a second frameless flat component of said arranged frameless flat components is arranged therebeneath.

10. A fastening assembly according to claim 1, further comprising a profile component that extends longitudinally relative to the assembled position and that runs beneath a transition gap between two adjacent frameless flat components being provided between two mutually opposing ones of said profile elements.

11. A fastening assembly according to claim 9, wherein each one of said profile elements further includes a laterally open receiving or clamping segment for receiving a clamping segment of said sealing element.

12. A fastening assembly according to claim 1, wherein each one of said profile elements further includes a support surface having a toothed or scored surface structure.

13. A fastening assembly according to claim 1, wherein at least one of said profile elements includes at least one hollow chamber in which a stiffening element is arranged.

14. A component group that is arranged on a framework and in which a plurality of adjacently arranged components are combined using a fastening assembly according to claim 1 to create a compound unit.

15. A component group according to claim 14, wherein an anti-theft element is provided merely on said exterior components.

16. A fastening assembly according to claim 1, wherein the retaining element is monolithically formed.

* * * * *